(12) United States Patent
Kobayashi (10) Patent No.: US 11,115,550 B2
(45) Date of Patent: Sep. 7, 2021

(54) MULTIFUNCTION PERIPHERAL

(71) Applicant: BROTHER KOGYO KABUSHIKI KAISHA, Nagoya (JP)

(72) Inventor: Isao Kobayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/023,559

(22) Filed: Sep. 17, 2020

(65) Prior Publication Data

US 2021/0099598 A1 Apr. 1, 2021

(30) Foreign Application Priority Data

Sep. 30, 2019 (JP) .............................. JP2019-180738

(51) Int. Cl.
*H04N 1/21* (2006.01)
*H04N 1/00* (2006.01)
*G06K 15/02* (2006.01)
*G06K 15/16* (2006.01)

(52) U.S. Cl.
CPC ....... *H04N 1/00679* (2013.01); *G06K 15/027* (2013.01); *G06K 15/16* (2013.01)

(58) Field of Classification Search
None
See application file for complete search history.

(56) References Cited

U.S. PATENT DOCUMENTS

| 8,917,416 B2 * | 12/2014 | Kobayashi | G06F 3/1256 358/1.2 |
| 2007/0014604 A1 * | 1/2007 | Arai | G03G 15/6523 399/341 |
| 2012/0042760 A1 * | 2/2012 | Mitsuhashi | B41J 11/46 83/72 |
| 2012/0262759 A1 | 10/2012 | Kudo | |
| 2014/0307019 A1 * | 10/2014 | Muro | B41J 11/663 347/16 |
| 2015/0165760 A1 * | 6/2015 | Murayama | B41J 2/2135 347/12 |
| 2017/0109617 A1 * | 4/2017 | Narimatu | G03G 15/55 |

(Continued)

FOREIGN PATENT DOCUMENTS

| JP | 2003-260833 A | 9/2003 |
| JP | 2012-223883 A | 11/2012 |

*Primary Examiner* — Dung D Tran
(74) *Attorney, Agent, or Firm* — Scully, Scott, Murphy & Presser, PC (57) ABSTRACT

A multifunction peripheral includes: a conveyor reeling out a recording medium from a roll medium and conveying the recording medium; a recording device; a cutter; a reading device; and a controller configured to: record a test image on the recording medium and cut the recording medium to form a rear end of the recording medium; generate read data of the test image; generate correction data relating to a cutting position of the recording medium based on a difference between a length obtained from the generated read data and an ideal value of the length; and record an image on the recording medium based on a recording command and cut the recording medium in a cutting position based on image data included in the recording command and the correction data to form the rear end of the recording medium.

7 Claims, 7 Drawing Sheets

(56) References Cited

U.S. PATENT DOCUMENTS

2018/0022118 A1\* 1/2018 Solans .................... B41J 11/68
                                                  347/110
2018/0081604 A1\* 3/2018 Shirasaka ............ G06K 15/404
2019/0377295 A1\* 12/2019 Igarashi ............. G03G 15/5016
2020/0005104 A1\* 1/2020 Fujimaki .............. G06K 15/022

\* cited by examiner

MULTIFUNCTION PERIPHERAL

CROSS-REFERENCE TO RELATED APPLICATIONS

This application claims priority from Japanese patent application No. 2019-180738 filed on Sep. 30, 2019, the entire subject-matter of which is incorporated herein by reference.

TECHNICAL FIELD

The present disclosure relates to a multifunction peripheral including a conveyor configured to reel out a recording medium from a roll medium and to convey the same in a conveying direction, a recording device configured to record an image on the recording medium reeled out and conveyed by the conveyor, a cutter configured to cut the recording medium to thereby form a rear end of the recording medium in the conveying direction, and a reading device configured to generate read data of the image recorded on the recording medium.

BACKGROUND

There has been disclosed a related-art technique of correctly cutting paper in a targeted cut position without depending on a type of the paper by adding a correction value inherent to each type of the paper to an amount of rotation of a conveying roller, considering a problem that a conveying load is different for each type of the paper (type of a recording medium) (for example, the conveying load is large in a case of thick roll paper (roll medium)), so that slip occurs and a cut position becoming a rear end of a sheet is thus out of position.

SUMMARY

According to one illustrative aspect of the present disclosure, there may be provided a multifunction peripheral comprising: a conveyor configured to reel out a recording medium from a roll medium on which the recording medium is wound, and to convey the recording medium in a conveying direction; a recording device configured to record an image on the recording medium reeled out and conveyed by the conveyor; a cutter configured to cut the recording medium to form a rear end of the recording medium in the conveying direction; a reading device configured to generate read data of the image recorded on the recording medium; and a controller configured to control the conveyor, the recording device, the cutter and the reading device, the controller being configured to perform: controlling the recording device to record a test image on the recording medium and controlling the cutter to cut the recording medium to form the rear end of the recording medium; after the recording of the test image, controlling the reading device to generate read data of the test image; after the generation of the read data, generating correction data relating to a cutting position of the recording medium by the cutter based on a difference between a length obtained from the generated read data and an ideal value of the length, the length being from a predetermined part of the test image to the rear end of the recording medium in the conveying direction; and after the generation of the correction data, main recording comprising controlling the recording device to record an image on the recording medium based on a recording command, and controlling the cutter to cut the recording medium in a cutting position based on image data included in the recording command and the correction data, to form the rear end of the recording medium.

In the present disclosure, after executing the test recording processing, the reading processing and the correction processing, the controller executes the main recording processing (processing of causing the recording device to record an image on the recording medium, based on the recording command, and causing the cutter to cut the recording medium in the cutting position based on the image data included in the recording command and the correction data generated in the correction processing, thereby forming the rear end of the recording medium). Thereby, it is possible to cut the recording medium in an appropriate position, considering individual differences for each multifunction peripheral, such as bending of the recording medium on the conveying path.

According to the present disclosure, it is possible to cut the recording medium in an appropriate position, considering individual differences for each multifunction peripheral.

BRIEF DESCRIPTION OF DRAWINGS

Illustrative embodiments of the disclosure will be described in detail based on the following figures, wherein.

DETAILED DESCRIPTION

The above-explained related art discloses the correction of the cutting position corresponding to the type of the recording medium but does not consider individual differences for each apparatus in the correction. For example, a bent aspect of the recording medium on a conveying path is different for each apparatus, and the bent aspect may influence the cutting position.

Therefore, illustrative aspects of the present disclosure provide a multifunction peripheral capable of cutting a recording medium in an appropriate position, considering individual differences for each multifunction peripheral.

Figure 1:
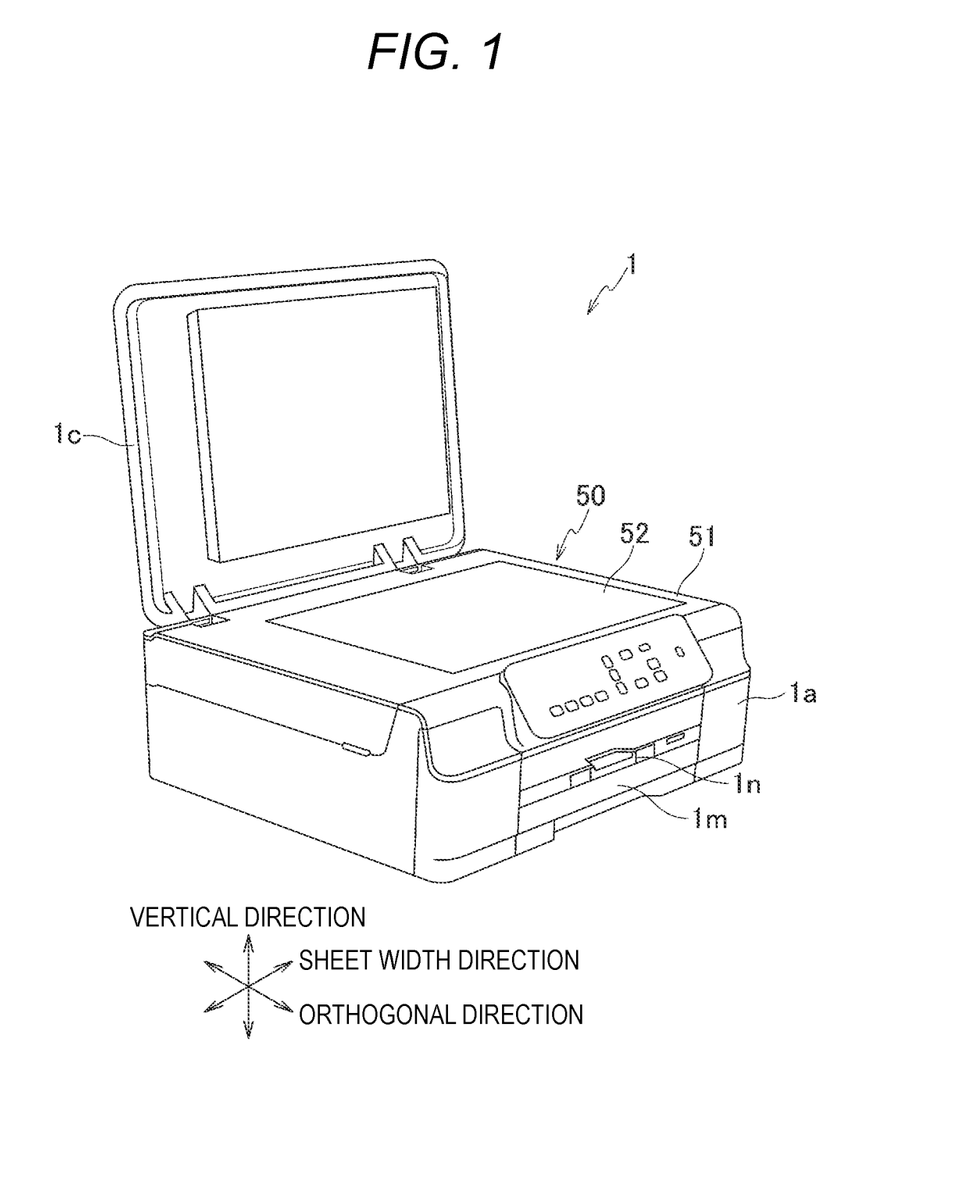
FIG. 1 is a perspective view depicting a multifunction peripheral in accordance with one illustrative embodiment of the present disclosure.
Figure 2:
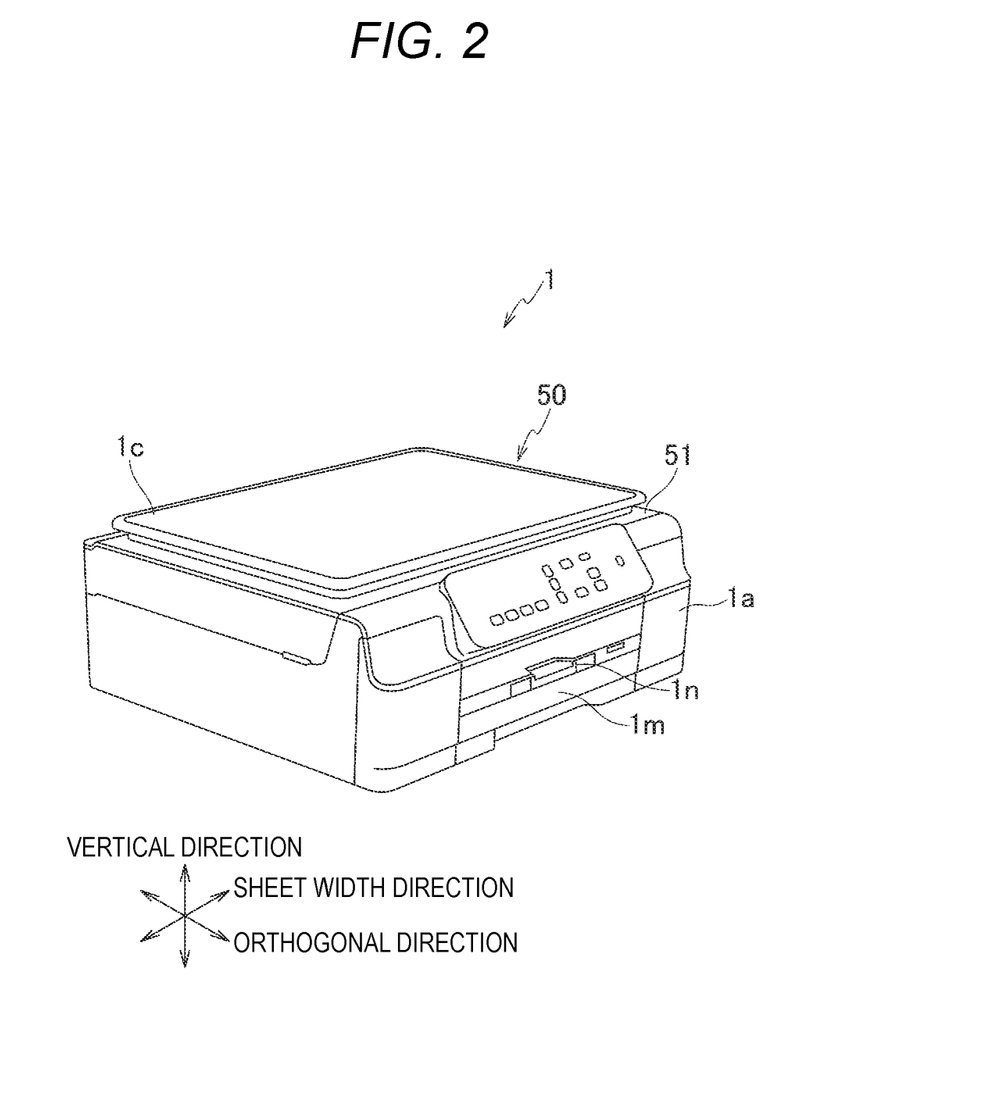
FIG. 2 is a perspective view depicting a closed state of a cover of the multifunction peripheral shown in FIG. 1.

As shown in FIGS. 1 and 2, a multifunction peripheral 1 in accordance with one illustrative embodiment of the present disclosure includes a housing 1*a*, a flatbed-type reading device 50 provided at an upper part of the housing 1*a*, a cover 1*c* openably/closably attached to the upper part of the housing 1*a*, a sheet cassette 1*m* detachably attached to a lower part of the housing 1*a*, and a sheet discharge tray 1*n* configured to open and close with respect to the housing 1*a*.

Figure 3:
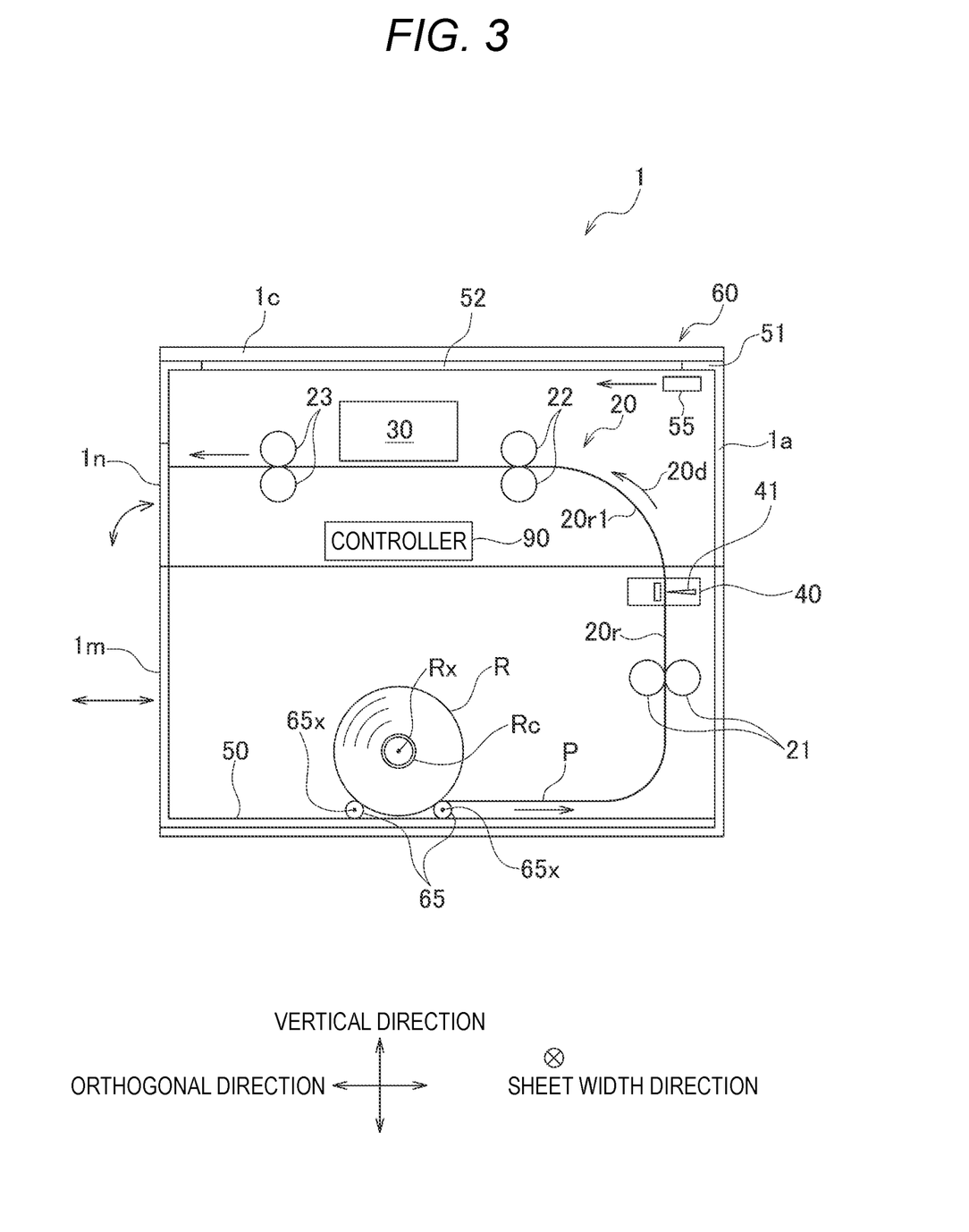
FIG. 3 is a schematic configuration view depicting an inside of a housing of the multifunction peripheral shown in FIG. 1.

As shown in FIG. 3, in the sheet cassette 1*m*, a roll paper R corresponding to "roll medium" of the present disclosure is accommodated. The roll paper R has such a configuration that a sheet P corresponding to "recording medium" of the present disclosure is wound in a roll shape on an outer peripheral surface of a cylindrical core member Rc. The roll paper R is arranged so that an axial direction along a center of rotation Rx (a center of the core member Rc) is orthogonal to a vertical direction. The axial direction corresponds to a width direction (sheet width direction) of the sheet P.

The sheet cassette $1m$ includes a cassette main body 60, a pair of rollers 65 configured to rotatably support the roll paper R, a pair of rollers 21 configured to convey the sheet P, and a cutter 40 configured to cut the sheet P. The pair of rollers 65, the pair of rollers 21, and the cutter 40 are supported to the cassette main body 60.

The pair of rollers 65 is arranged on a bottom of the cassette main body 60, and is spaced from each other in an orthogonal direction orthogonal to the sheet width direction and the vertical direction. The pair of rollers 65 is in contact with parts of the outer peripheral surface of the roll paper R below the center of rotation Rx and can rotate about axes $65x$ parallel to the sheet width direction in accordance with rotation of the roll paper R.

Figure 4:
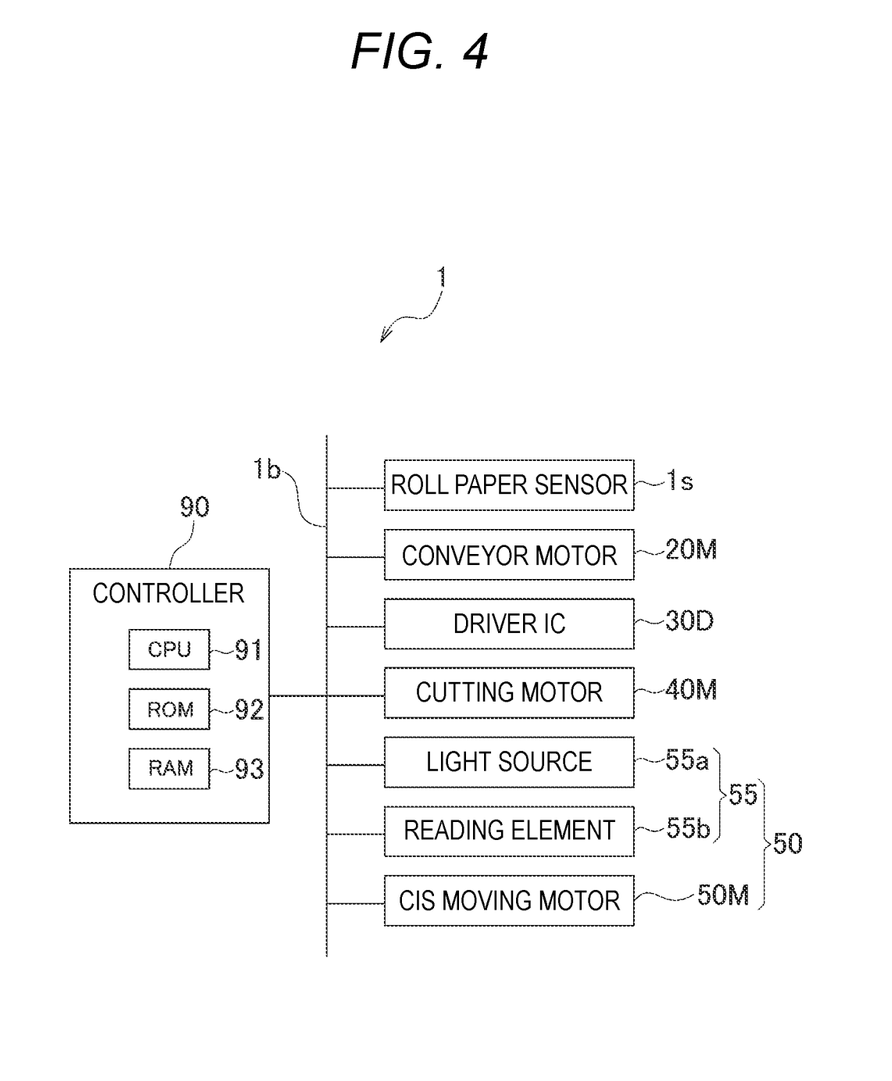
FIG. 4 is a block diagram depicting an electrical configuration of the multifunction peripheral shown in FIG. 1.

The pair of rollers 65 is provided with roll paper sensors $1s$ (refer to FIG. 4). The roll paper sensors $1s$ output an ON signal when the roll paper R is supported to the pair of rollers 65, and output an OFF signal when the roll paper R is not supported to the pair of rollers 65.

The pair of rollers 21 extends in the sheet width direction above the pair of rollers 65. The pair of rollers 21 configures a conveyor 20 that will be described later.

The cutter 40 is arranged above the pair of rollers 21. The cutter 40 includes a cutter 41, and a cutting motor 40M (refer to FIG. 4) configured to drive the cutter 41.

An upper part of the housing $1a$ (above the sheet cassette $1m$ in the housing $1a$) is provided with pairs of rollers 22 and 23 configuring the conveyor 20, a head 30, and a controller 90.

Each of the pairs of rollers 22 and 23 extends in the sheet width direction, like the pair of rollers 21. The pairs of rollers 22 and 23 are arranged with sandwiching the head 30 therebetween in the orthogonal direction.

The conveyor 20 includes the pairs of rollers 21 to 23, and a conveyor motor 20M (refer to FIG. 4). Each of the pairs of rollers 21 to 23 is configured by a drive roller configured to rotate by drive of the conveyor motor 20M and a driven roller configured to rotate in association with the drive roller. Under control of the controller 90, the conveyor motor 20M is driven and each of the pairs of rollers 21 to 23 is rotated with sandwiching the sheet P therebetween, so that the sheet P is reeled out from the roll paper R and is conveyed in a conveying direction $20d$ along a conveying path $20r$.

The head 30 includes a plurality of nozzles (not shown) formed in a lower surface thereof, and a driver IC 30D (refer to FIG. 4). When the driver IC 30D is driven under control of the controller 90, ink is discharged from the nozzles, so that an image is recorded on the sheet P conveyed by the conveyor 20. The head 30 corresponds to "recording device" of the present disclosure, and may be either a line type configured to discharge ink from nozzles in a state where a position thereof is fixed or a serial type configured to discharge ink from nozzles with moving in the sheet width direction.

The cutter 40 is arranged between the pairs of rollers 21 and 22 on the conveying path $20r$, and is also arranged upstream of the head 30 with respect to the conveying direction $20d$.

The cutting motor 40M is driven under control of the controller 90, so that the sheet P reeled out from the roll paper R is cut by the cutter 41. Thereby, a rear end of the sheet Pin the conveying direction $20d$ is formed. The sheet P on which an image is recorded by the head 30 and is cut by the cutter 41 is accommodated in the sheet discharge tray $1n$ in an opened state with respect to the housing $1a$.

The reading device 50 includes a document platen 51 configured by an upper part of the housing $1a$, and a line sensor 55 arranged in the housing $1a$.

A transparent plate 52 made of plastic, glass or the like is fitted in the document platen 51. The sheet P that is a reading target is placed on the transparent plate 52.

The line sensor 55 is, for example, a CIS (abbreviation of Contact Image Sensor) type (equal-magnification optical system), and includes a light source $55a$ (refer to FIG. 4), a lens (not shown), and a reading element $55b$ (refer to FIG. 4).

As shown in FIGS. 1 and 2, the cover $1c$ can be opened and closed with respect to the document platen 51. When the cover $1c$ is closed, outside light is suppressed from entering the line sensor 55.

When reading an image on the sheet P placed on the transparent plate 52, the CIS moving motor 50M (refer to FIG. 4) is driven under control of the controller 90, so that the line sensor 55 moves along the transparent plate 52. At this time, light irradiated from the light source $55a$ penetrates the transparent plate 52, is reflected on the sheet P, and is then incident on the reading element $55b$ through the lens. The reading element $55b$ is configured to convert the received light into electric signals to generate read data of the image (data indicative of an amount of received light), and to output the read data to the controller 90.

As shown in FIG. 4, the controller 90 is connected to the roll paper sensor $1s$, the conveyor motor 20M, the driver IC 30D, the cutting motor 40M, the light source $55a$, the reading element $55b$ and the CIS moving motor 50M via an internal bus $1b$.

The controller 90 includes a CPU (abbreviation of Central Processing Unit) 91, a ROM (abbreviation of Read Only Memory) 92 and a RAM (abbreviation of Random Access Memory) 93. In the ROM 92, programs and data by which the CPU 91 performs various controls are stored. The RAM 93 is configured to temporarily store data that is used when the CPU 91 executes a program.

Figure 5:
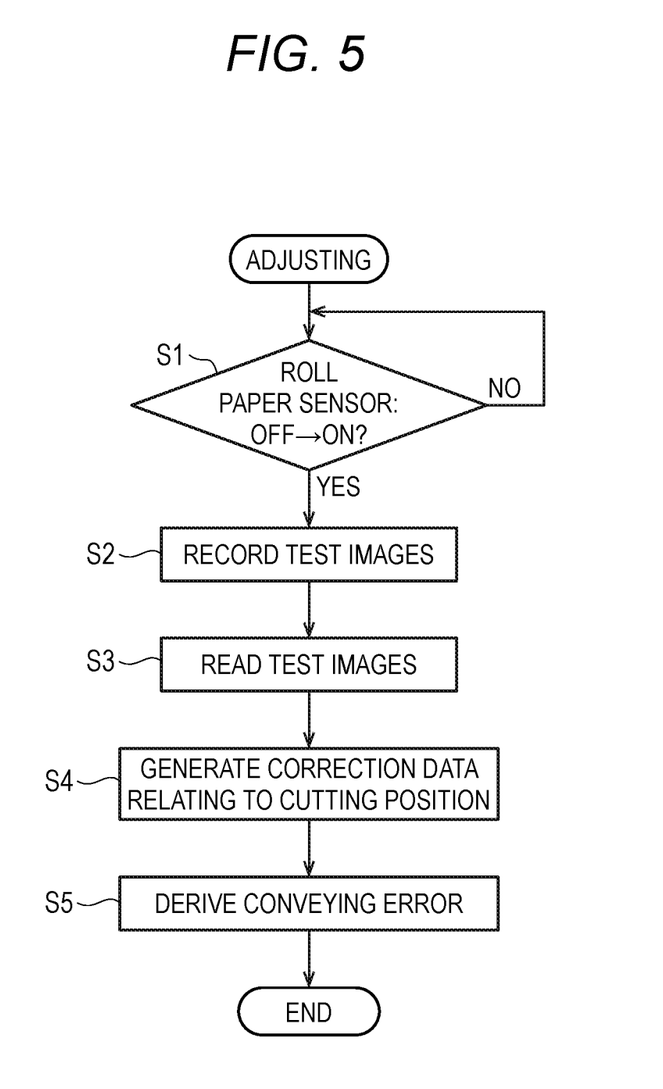
FIG. 5 is a flowchart depicting an adjusting routine that is executed by a controller of the multifunction peripheral shown in FIG. 1.

Subsequently, an adjusting routine that is executed by the controller 90 is described with reference to FIG. 5.

In the adjusting routine, the controller 90 first determines whether a signal of the roll paper sensor $1s$ is switched from OFF to ON (S1). For example, when the user first arranges the roll paper R in the sheet cassette $1m$ after purchasing the multifunction peripheral 1 or replaces the roll paper R, the signal of the roll paper sensor $1s$ is switched from OFF to ON.

When it is determined that the signal of the roll paper sensor $1s$ is not switched from OFF to ON (S1: NO), the controller 90 repeats the processing of S1.

When it is determined that the signal of the roll paper sensor $1s$ is switched from OFF to ON (S1: YES), the controller 90 executes test recording processing (S2).

In the test recording processing (S2), the controller 90 causes the conveyor 20 to convey the sheet P, causes the head 30 to record test images T1 and T2 (refer to FIG. 6) on the sheet P, and causes the cutter 40 to cut the sheet P, thereby forming a rear end Pr (refer to FIG. 6) of the sheet Pin the conveying direction $20d$. A front end Pf of the sheet Pin the conveying direction 20d is a tip end of a brand-new roll paper R or is formed by previous cutting.

Figure 6:
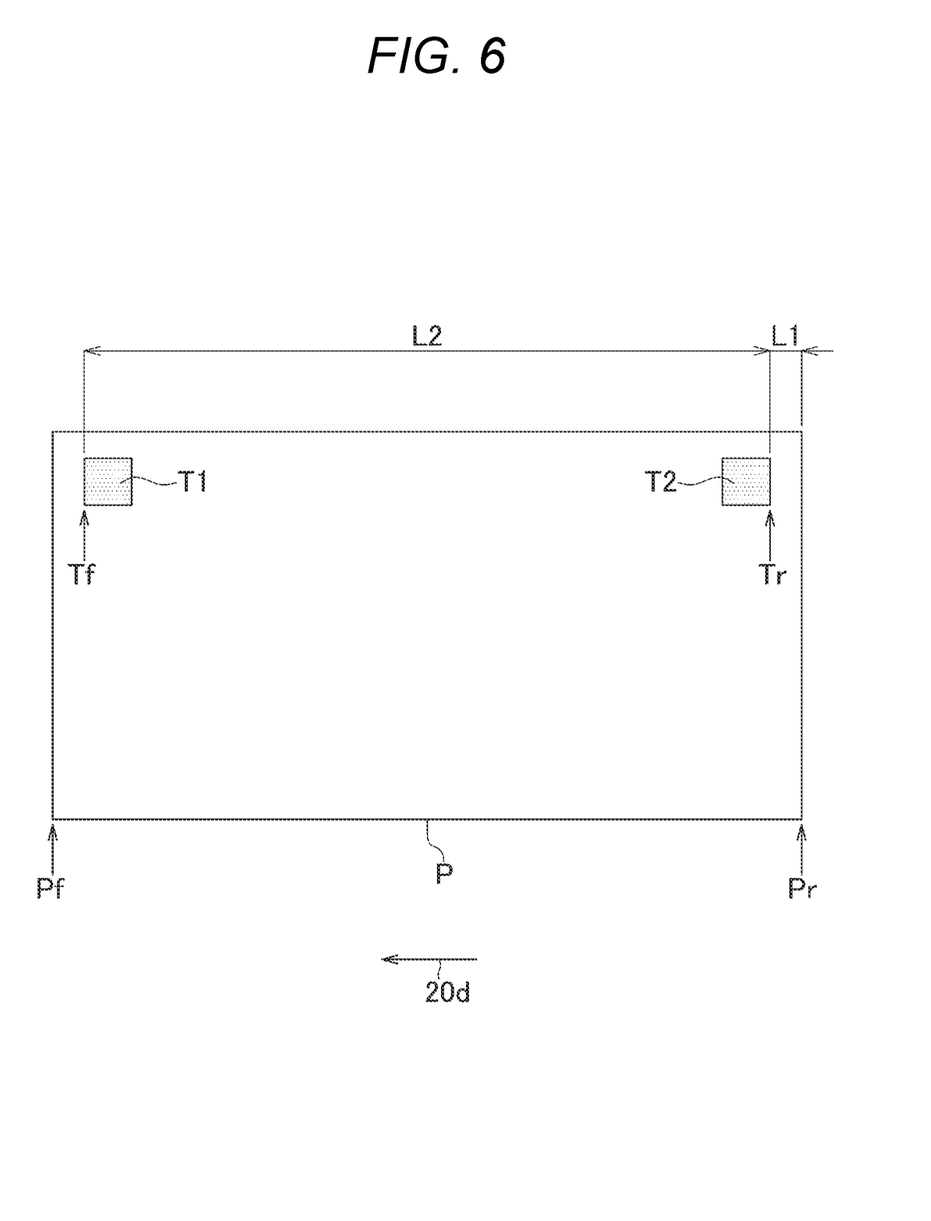
FIG. 6 is a schematic view for illustrating S2 of FIG. 5.

In the present illustrative embodiment, the two test images T1 and T2 spaced from each other in the conveying direction 20d are recorded. The test image T1 is recorded in a position spaced upstream from the front end Pf with respect to the conveying direction 20d by a predetermined distance, in the vicinity of the front end Pf. The test image T2 is recorded in a position spaced downstream from the rear end Pr with respect to the conveying direction 20d by a predetermined distance, in the vicinity of the rear end Pr.

After the test recording processing (S2), the controller 90 executes reading processing (S3) of the test images T1 and T2.

After the test recording processing (S2) and before the reading processing (S3), the sheet P having the test images T1 and T2 recorded thereon is placed on the transparent plate 52 of the document platen 51. For example, after the user places, on the transparent plate 52, the sheet P having the test images T1 and T2 recorded in S2 and accommodated in the sheet discharge tray 1n, and closes the cover 1c, the user may give an instruction through an input interface (a switch or a button provided on the housing 1a), so that the controller 90 may start the reading processing (S3) by using the instruction as a trigger. Alternatively, a moving mechanism provided in the multifunction peripheral 1 may move the sheet P having the test images T1 and T2 recorded in S2 and accommodated in the sheet discharge tray 1n onto the transparent plate 52, and the controller 90 may start the reading processing (S3) when the sheet P is placed on the transparent plate 52.

In the reading processing (S3), while moving the line sensor 55 by the drive of the CIS moving motor 50M, the controller 90 irradiates the light from the light source 55a toward the sheet P, thereby causing the reading element 55b to generate read data (data indicative of an amount of received light) of the test images T1 and T2.

After the reading processing (S3), the controller 90 generates correction data relating to a cutting position of the sheet P by the cutter 40 (S4: correction processing).

In the correction processing (S4), the controller 90 first obtains, from the read data generated in the reading processing (S3), a length L1 (refer to FIG. 6) in the conveying direction 20d from a rear end Tr (predetermined part) of the test image T2 in the conveying direction 20d to the rear end Pr of the sheet P. The length L1 depends on a bent aspect of the sheet P on the conveying path 20r. For example, on the conveying path 20r shown in FIG. 3, there is a curved part 20r1 between the cutter 40 and the pair of rollers 22. The sheet P is bent on the curved part 20r1, and the cutting position of the sheet P by the cutter 40 is changed depending on the bent aspect, so that the length L1 may change. Also, the bent aspect may be different depending on a type of the sheet P (thickness, stiffness and the like).

Therefore, in the correction processing (S4), the controller 90 generates correction data relating to the cutting position of the sheet P by the cutter 40, based on a difference between the obtained length L1 and an ideal value of the length (for example, a value stored in the ROM 92), and stores the same in the RAM 93. Specifically, a downstream side with respect to the conveying direction 20d is set positive, and when the length L1 is smaller than the ideal value, correction data of "negative value" is generated, when the length L1 is the same as the ideal value, correction data of "0" is generated, and when the length L1 is greater than the ideal value, correction data of "positive value" is generated.

After the correction processing (S4), the controller 90 derives a conveying error of the conveyor 20 (S5).

In S5, the controller 90 first obtains, from the read data generated in the reading processing (S3), a length L2 (refer to FIG. 6) in the conveying direction 20d from a front end Tf of the test image T1 in the conveying direction 20d to the rear end Tr of the test image T2. The length L2 depends on conveying accuracy of the conveyor 20.

In S5, the controller 90 derives, as a conveying error of the conveyor 20, a difference between the obtained length L2 and an ideal value of the length (for example, a value stored in the ROM 92), and stores the same in the RAM 93. Specifically, a downstream side with respect to the conveying direction 20d is set positive, and when the length L2 is smaller than the ideal value, a conveying error of "negative value" is derived, when the length L2 is the same as the ideal value, a conveying error of "0" is derived, and when the length L2 is greater than the ideal value, a conveying error of "positive value" is derived.

After S5, the controller 90 ends the adjusting routine.

Figure 7:
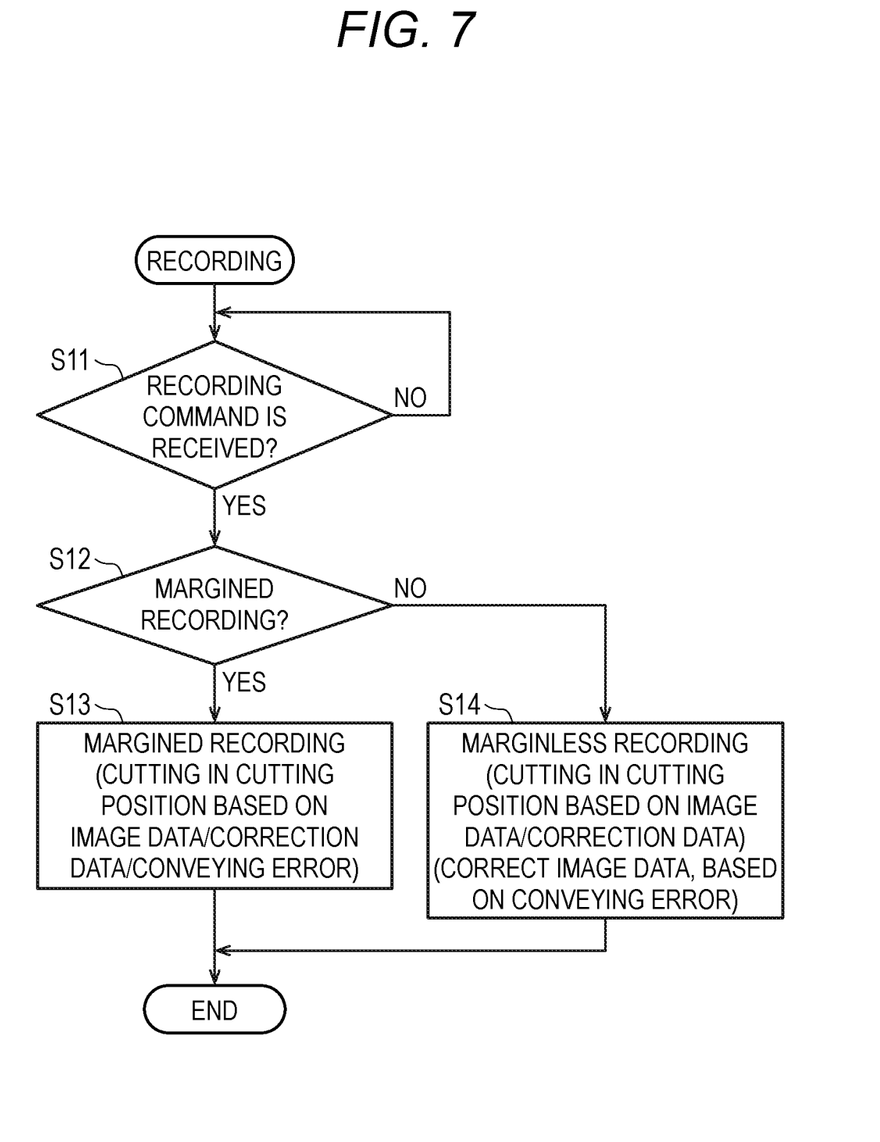
FIG. 7 is a flowchart depicting a recording routine that is executed by the controller of the multifunction peripheral shown in FIG. 1.

Subsequently, a recording routine that is executed by the controller 90 is described with respect to FIG. 7. The recording routine is executed after the adjusting routine is executed.

In the recording routine, the controller 90 first determines whether a recording command including image data and the like is received from an external apparatus such as a PC (Personal Computer) (S11). When it is determined that the recording command is not received (S11: NO), the controller 90 repeats the processing of S11.

When it is determined that the recording command is received (S11: YES), the controller 90 determines whether the recording command is a command indicative of "margined recording" (S12).

The recording includes "margined recording" and "marginless recording". The "margined recording" means that a margin is provided on an edge of the sheet P upon the recording (i.e., the ink is not discharged from the nozzles to an edge of the sheet P, so that an image is not recorded on the edge). The "marginless recording" means that no margin is provided on an edge of the sheet P upon the recording (i.e., the ink is discharged from the nozzles to an edge of the sheet P, so that an image is recorded on the edge).

When it is determined that the recording command is a command indicative of "margined recording" (S12: YES), the controller 90 executes main recording processing relating to "margined recording" (S13).

In S13, the controller 90 causes the conveyor 20 to convey the sheet P and causes the head 30 to record an image on the sheet P, based on the recording command received in S11.

Also, in S13, the controller 90 causes the cutter 40 to cut the sheet P in a cutting position based on the image data included in the recording command received in S11, the correction data generated in S4 and the conveying error derived in S5. Thereby, the rear end Pr of the sheet P is formed.

Specifically, a position moved downstream with respect to the conveying direction 20d from a cutting position (original cutting position) based on the image data by a sum of a value of the correction data generated in S4 and a value of the conveying error derived in S5 is set as the cutting position in S13.

Therefore, when the length L1 (refer to FIG. 6) is smaller than the ideal value (the correction data is "negative value") or when the length L2 (refer to FIG. 6) is greater than the ideal value (the conveying error is "negative value"), a position moved upstream with respect to the conveying direction 20d from the original cutting position becomes the cutting position, so that the length of the sheet P in the conveying direction 20d becomes longer, as compared to a case where the sheet is cut in the original cutting position. When the length L1 (refer to FIG. 6) is greater than the ideal value (the correction data is "positive value") or when the length L2 (refer to FIG. 6) is smaller than the ideal value (the conveying error is "positive value"), a position moved downstream with respect to the conveying direction 20d from the original cutting position becomes the cutting position, so that the length of the sheet P in the conveying direction 20d becomes shorter, as compared to a case where the sheet is cut in the original cutting position.

When it is determined that the recording command is not a command indicative of "margined recording" (i.e., the recording command is a command indicative of "marginless recording") (S12: NO), the controller 90 executes main recording processing relating to "marginless recording" (S14).

In S14, the controller 90 corrects the image data, based on the conveying error derived in S5, and then causes the conveyor 20 to convey the sheet P and causes the head 30 to record an image on the sheet P, based on the recording command received in S11.

Specifically, when the length L2 (refer to FIG. 6) is smaller than the ideal value (the conveying error is "positive value"), the number of dots of the image data is increased so that the length of the image data in the conveying direction 20d becomes longer. When the length L2 (refer to FIG. 6) is greater than the ideal value (the conveying error is "negative value"), the number of dots of the image data is reduced so that the length of the image data in the conveying direction 20d becomes shorter.

Also, in S14, the controller 90 causes the cutter 40 to cut the sheet P in a cutting position based on the image data included in the recording command received in S11 and the correction data generated in S4. Thereby, the rear end Pr of the sheet P is formed.

Specifically, a position moved downstream with respect to the conveying direction 20d from a cutting position (original cutting position) based on the image data by a value of the correction data generated in S4 is set as the cutting position in S14.

Therefore, when the length L1 (refer to FIG. 6) is smaller than the ideal value (the correction data is "negative value"), a position moved upstream with respect to the conveying direction 20d from the original cutting position becomes the cutting position, so that the length of the sheet P in the conveying direction 20d becomes longer, as compared to a case where the sheet is cut in the original cutting position. When the length L1 (refer to FIG. 6) is greater than the ideal value (the correction data is "positive value"), a position moved downstream with respect to the conveying direction 20d from the original cutting position becomes the cutting position, so that the length of the sheet P in the conveying direction 20d becomes shorter, as compared to a case where the sheet is cut in the original cutting position.

After S13 or S14, the controller 90 ends the recording routine.

As described above, according to the present illustrative embodiment, after executing the test recording processing (S2), the reading processing (S3) and the correction processing (S4), the controller 90 executes the main recording processing (S13; S14) (the processing of causing the head 30 to record an image on the sheet P, based on the recording command, and causing the cutter 40 to cut the sheet P in the cutting position based on the image data included in the recording command and the correction data generated in the correction processing S4, thereby forming the rear end Pr of the sheet P). Thereby, it is possible to cut the sheet P in an appropriate position, considering individual differences for each multifunction peripheral 1, such as bending of the sheet P on the conveying path 20r.

The cutter 40 is arranged upstream of the head 30 with respect to the conveying direction 20d. When the cutter 40 is arranged downstream of the head 30 with respect to the conveying direction 20d, in the main recording processing (S13; S14), the cutting by the cutter 40 is performed after the image recording by the head 30 is completed. Therefore, even though the test recording processing (S2) and the like are not executed before the main recording processing (S13; S14), in the main recording processing (S13; S14), after the image recording by the head 30 is completed, the cutting position can be adjusted based on the image. In contrast, when the cutter 40 is arranged upstream of the head 30 with respect to the conveying direction 20d, in the main recording processing (S13; S14), the cutting by the cutter 40 is generally performed before the image recording by the head 30 is completed. Therefore, in the main recording processing (S13; S14), after the image recording by the head 30 is completed, it is difficult to adjust the cutting position, based on the image. Therefore, the present disclosure is particularly effective when the cutter 40 is arranged upstream of the head 30 with respect to the conveying direction 20d.

When it is determined that the recording command is a command indicative of "margined recording" (S12: YES), the controller 90 causes the cutter 40 to cut the sheet P in the cutting position based on the image data included in the recording command received in S11, the correction data generated in S4 and the conveying error of the conveyor 20, in the main recording processing (S13). In this case, in the margined recording, it is possible to suppress a situation where a length of a margin becomes different from a desired length due to the conveying error.

When it is determined that the recording command is a command indicative of "marginless recording" (S12: NO), the controller 90 corrects the image data, based on the conveying error of the conveyor 20, and causes the head 30 to record an image on the sheet P, in the main recording processing (S14). In this case, in the marginless recording, it is possible to suppress a situation where a margin occurs on an edge of the sheet P due to the conveying error.

In the meantime, the conveying error is caused due to inclination of the head 30 and a flying direction of the ink from the nozzles, and may increase as the length of the sheet P in the conveying direction 20d increases. The sheet P reeled out from the roll paper R is often cut into a long length, and the configuration in which the cutting position and the image data are adjusted based on the conveying error is particularly effective when the sheet P is cut into a long length.

The controller 90 derives the conveying error from the read data generated in the reading processing (S3) (S5). In this case, it is not necessary to separately execute processing for deriving the conveying error, so that the processing is simplified.

The controller 90 executes the test recording processing (S2), the reading processing (S3) and the correction processing (S4) before the first main recording processing (S13, S14) using the roll paper R is executed. In this case, the cutting position of the sheet P is corrected, in accordance with the bent aspect that may be different depending on a type of the sheet P (thickness, stiffness and the like) configuring the roll paper R. Therefore, it is possible to cut the sheet P in an appropriate position, considering individual differences for each multifunction peripheral 1 and the type of the sheet P.

MODIFICATION TO ILLUSTRATIVE EMBODIMENTS

Although the preferred illustrative embodiment of the present disclosure has been described, the present disclosure is not limited to the above-described illustrative embodiment and a variety of design changes can be made within the scope of the claims.

The cutter may be arranged in any positon on the conveying path. For example, in the above-described illustrative embodiment (FIG. 3), the cutter 40 is arranged between the pairs of rollers 21 and 22 on the conveying path 20*r* but may also be arranged upstream of the pair of rollers 21 with respect to the conveying direction 20*d*. Also, the cutter is not limited to being arranged upstream of the recording device with respect to the conveying direction, and may also be arranged downstream of the recording device with respect to the conveying direction. For example, in the above-described illustrative embodiment (FIG. 3), the cutter 40 may be arranged between the head 30 and the pair of rollers 23 on the conveying path 20*r* or may be arranged downstream of the pair of rollers 23 with respect to the conveying direction 20*d*.

The timings at which the test recording processing, the reading processing and the correction processing are executed are arbitrary. For example, in the above-described illustrative embodiment (FIG. 5), when the signal of the roll paper sensor 1*s* is switched from OFF to ON, the test recording processing (S2), the reading processing (S3) and the correction processing (S4) are executed. However, the present disclosure is not limited thereto. For example, the processing may be executed at a timing corresponding to a user's instruction or every predetermined time period.

The number, shape and the like of the test images recorded in the test recording processing are arbitrary. For example, in the above-described illustrative embodiment (FIG. 6), the two test images T1 and T2 spaced from each other in the conveying direction 20*d* are recorded. However, the present disclosure is not limited thereto. For example, one test image that is long in the conveying direction 20*d* may be recorded.

The conveying error is not limited to being derived from the read data generated in the reading processing. For example, a parameter (for example, the number of rotations of the conveyor motor 20M) that is used in a separate conveying control from the adjusting of the cutting position) may be used as the conveying error in the main recording processing. In this case, the length L2 (refer to FIG. 6) may not be obtained from the read data.

In the test recording processing and the main recording processing, the timings of the recording by the recording device and the cutting by the cutter are arbitrary. That is, the cutting may be performed before the recording, during the recording or after the recording. For example, in the configuration where the cutter is arranged upstream of the recording device with respect to the conveying direction, like the above-described illustrative embodiment, the cutting may be performed during the recording. In the configuration where an image is recorded only on the front end of the recording medium or the cutter is arranged downstream of the recording device with respect to the conveying direction, the cutting may be performed after the recording.

In the "length from the predetermined part of the test image from the rear end of the recording medium in the conveying direction" obtained in the correction processing, the "predetermined part" of the test image is the rear end Tr of the test image, in the above-described illustrative embodiment. However, the present disclosure is not limited thereto. For example, the predetermined part may be the front end of the test image, a center of the test image, or the like.

In the above-described illustrative embodiment, the roll medium has the core member Rc. However, the core member Rc may be omitted.

The recording medium is not limited to the sheet. For example, a fabric, a substrate and the like may also be used.

The recording device may be configured to discharge a liquid other than the ink (for example, a treatment solution for aggregating or precipitating components in the ink). Also, the recording device is not limited to the liquid discharge type and may also be a laser type, a thermal transfer type or the like.

What is claimed is:

1. A multifunction peripheral comprising:
   a conveyor configured to reel out a recording medium from a roll medium on which the recording medium is wound, and to convey the recording medium in a conveying direction;
   a cutter configured to cut the recording medium to form a rear end of the recording medium in the conveying direction; and
   a controller configured to control the conveyor, recording an image on the recording medium reeled out and conveyed by the converyor, the cutter and the reading data of the image recorded on the recording medium, the controller being configured to perform:
   controlling recording a test image on the recording medium and controlling the cutter to cut the recording medium to form the rear end of the recording medium;
   after the recording of the test image, controlling generating read data of the test image;
   after the generation of the read data, generating correction data relating to a cutting position of the recording medium by the cutter based on a difference between a length obtained from the generated read data and an ideal value of the length, the length being from a predetermined part of the test image to the rear end of the recording medium in the conveying direction; and
   after the generation of the correction data, main recording comprising controlling recording an image on the recording medium based on a recording command, and controlling the cutter to cut the recording medium in a cutting position based on image data included in the recording command and the correction data, to form the rear end of the recording medium.

2. The multifunction peripheral according to claim 1, wherein the cutter is arranged upstream of a recording device in the conveying direction, the recording device being configured to record an image on the recording medium reeled out and conveyed by the conveyor.

3. The multifunction peripheral according to claim 1, wherein in the main recording, in a case the recording command is a command indicative of margined recording in which a margin is provided on an edge of the recording medium, the controller is configured to control the cutter to cut the recording medium in a cutting position based on the image data, the correction data, and a conveying error of the conveyor.

4. The multifunction peripheral according to claim 1, wherein in the main recording, in a case the recording command is a command indicative of marginless recording in which no margin is provided on an edge of the recording medium, the controller is configured to correct the image data based on a conveying error of the conveyor, and control recording an image on the recording medium.

5. The multifunction peripheral according to claim 3, wherein the controller is configured to derive the conveying error from the generated read data.

6. The multifunction peripheral according to claim 4, wherein the controller is configured to derive the conveying error from the generated read data.

7. The multifunction peripheral according to claim 1, wherein the controller is configured to perform the recording of the test image, the generation of the read data and the generation of the correction data before the first performance of the main recording using the roll medium.

\* \* \* \* \*

UNITED STATES PATENT AND TRADEMARK OFFICE
CERTIFICATE OF CORRECTION

PATENT NO. : 11,115,550 B2
APPLICATION NO. : 17/023559
DATED : September 7, 2021
INVENTOR(S) : Kobayashi It is certified that error appears in the above-identified patent and that said Letters Patent is hereby corrected as shown below:

In the Claims

Column 10, Claim 1, Line 33 should read:
conveyed by the conveyor, the cutter, and reading Column 11, Claim 7, Line 20 should read:
generation of the correction data before a first performance Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*